May 2, 1939.  D. R. KNOX  2,156,592
MAGNETIC TESTING APPARATUS
Filed Dec. 14, 1936
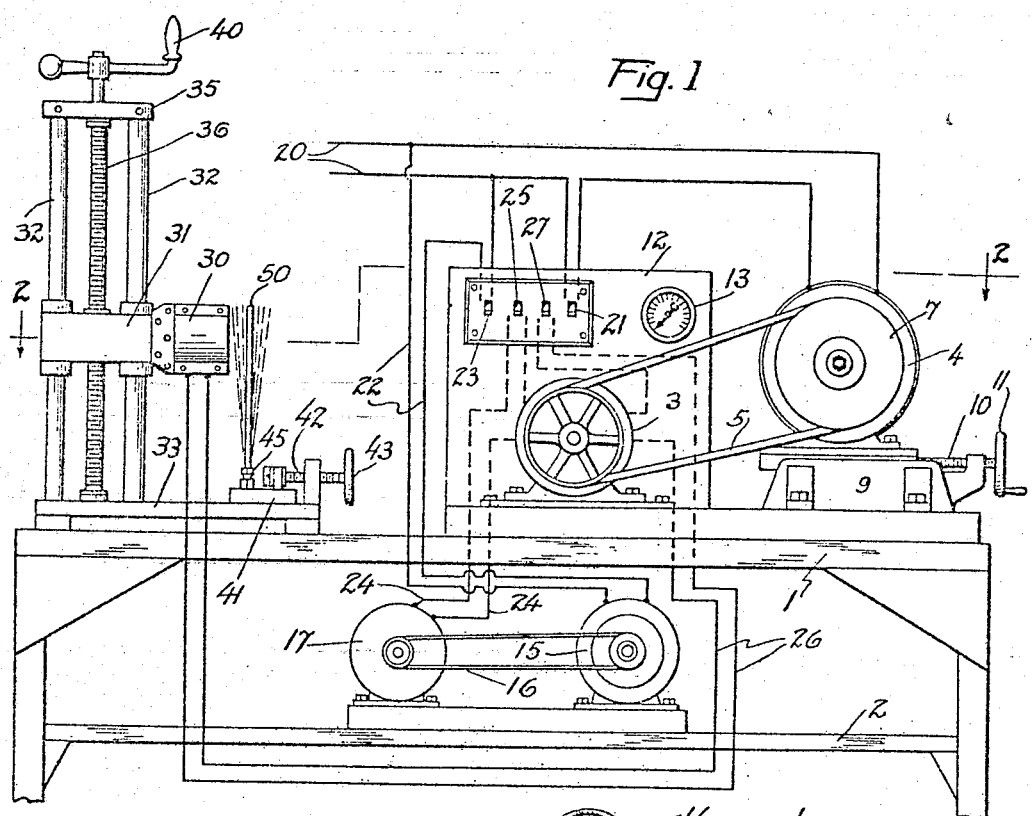
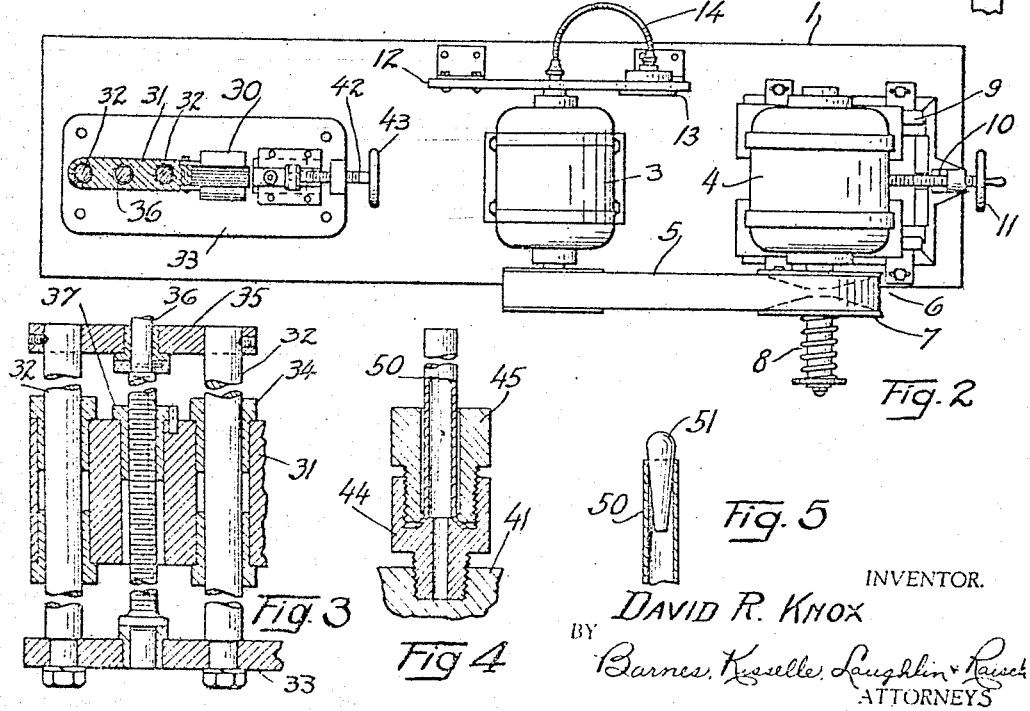
INVENTOR.
DAVID R. KNOX
BY Barnes, Kisselle, Laughlin & Raisch
ATTORNEYS May 2, 1939

2,156,592

UNITED STATES PATENT OFFICE 2,156,592

MAGNETIC TESTING APPARATUS

David R. Knox, Detroit, Mich., assignor to Bundy Tubing Company, Detroit, Mich., a corporation of Michigan Application December 14, 1936, Serial No. 115,875

3 Claims. (Cl. 73—51)

This invention relates to the testing of materials in considering the fatigue characteristics or endurance limit thereof. The invention is concerned particularly with an apparatus and method for subjecting the material to tests in ascertaining, considering or studying material from the fatigue or endurance standpoint.

Usually metal is the material which forms the subject of the test, although, of course, the invention is not limited to metals. There are a number of objects to the invention, some of which are as follows:

The obtaining of a test of material under conditions which the material or the article formed thereby is to be mounted or used in a commercial way. To explain this point it may be stated that a piece of metal tubing, for example, may be mounted in the testing machine precisely as it is to be mounted in commercial use. During the test the test piece is not engaged by mechanical elements which might set up unknown stresses in the material which would either have to be neglected or estimated in calculating the maximum fibre stress.

Another object of the invention is the provision of an apparatus and method so organized that the frequency of vibration in the test may be easily changed so that the apparatus can be used successively with different test pieces requiring different vibration frequencies.

A further object of the invention is the obtaining of a test where one end of a test piece is mounted entirely free from engagement with a machine element or the like so as to eliminate the setting up of indeterminate stresses due to gripping the test piece in such a way as to set up a stress either in the nature of torque, tension or compression in the test piece.

There are other objects of the invention which can best be brought out as the detailed description progresses and which will be better appreciated when brought out in that way.

To these ends electromagnetic force is used for setting up vibrations in the test piece. This is done by continually setting up and breaking down electromagnetic flux which is impressed upon a portion of the test piece to cause the same to vibrate. The frequency of the vibration is preferably that of the natural frequency of the test piece, which can be very easily ascertained, as will be presently set forth. The magnetic action is perhaps best obtained by the use of an alternating current, in connection with which the cycle is variable so that it may be brought into tune with the natural frequency of the test piece. Direct current of the interrupted type may be used.

In the accompanying drawing:

Fig. 1 is a side elevational view illustrating an apparatus constructed in accordance with the invention, showing the test piece and illustrating diagrammatically the electrical wiring arrangement.

Fig. 2 is a view taken substantially on line 2—2 of Fig. 1 illustrating part of the apparatus in top plan and part in cross section.

Fig. 3 is a detail sectional view of a standard for the electromagnet.

Fig. 4 is an enlarged sectional view illustrating a mounting for a piece of tube which constitutes a test piece.

Fig. 5 is a view illustrating how a test piece of non-magnetic material may be tested by the invention.

In the accompanying drawing the test piece shown takes the form of a tube which is supported by a conventional type of mounting involving coupling elements such as are used when the tube is installed for use. The invention, however, is applicable to the testing of work other than tubes, as for example, rods, strips, or other forms or shapes.

In Fig. 1 the apparatus is shown on a supporting table 1 having a lower shelf 2, this being merely illustrated for convenience. An alternating current generator is illustrated at 3 driven by a motor 4 through the means of a belt 5 which may be a type of V belt. In the form shown a variable speed drive pulley is used, this being of a type available on the market. It comprises a pulley made in two parts 6 and 7, the parts being of conical form and urged together by a spring 8. The motor may be fed forwardly and backwardly on a support 9, upon which it is slidably mounted, by means of a screw threaded shaft 10 with a controlling hand wheel 11. As the motor is moved to the right the two parts of the pulley are spread apart and the belt runs over a smaller radius, thus changing the ratio between the speed of the motor and the speed of the generator; as the motor is shifted to the left the spring 8 moves the two pulley parts toward each other and the belt is caused to move on a larger radius. This is one way for varying the speed of the generator to vary and control the cycle of the alternating current. Another way of accomplishing this is to use a driving motor of the variable speed type. Other types of infinitely variable speed transmissions are commercially available.

An instrument panel is shown at 12 upon which is mounted a tachometer 13 connected to the shaft of the generator as by means of a flexible driving shaft 14. From this, one can readily ascertain the R. P. M. of the generator.

Another motor is illustrated at 15 for driving, through the means of a belt or the like 16, a direct current generator 17 for exciting the field coils of the generator 3. A self-exciting generator might be used.

The electrical connections diagrammatically illustrated include lead lines 20 from a source of electrical current which run to the driving motor 4, the driving motor being controlled by a suitable switch 21. Conductors 22 extend to the motor 15 running through the control switch 23. Conductors 24 connect the D. C. generator 17 to the field of the alternating current generator 3, running through a control switch 25. Lead lines 26 extend from the alternating current generator 3 to the electromagnet, as shown, through a control switch 27. This electrical arrangement is merely diagrammatically illustrated and the switches are not shown in detail and are illustrated as being single pole switches.

The test apparatus includes a suitable electromagnet 30 mounted on a bracket 31 in turn slidably mounted upon guide rods 32. These guide rods may be mounted upon a suitable base 33. Suitable bushings 34 may be used as illustrated in Fig. 3. These guide rods are joined by a cross head 35. An adjusting screw 36 is rotatably mounted in the cross head 35 and in the base 33 and has a screw thread connection with the bracket 31. This may be accomplished by the use of an internally threaded bushing 37 secured to the bracket so that it will not rotate relative thereto nor shift axially of the bracket. The top of the adjusting screw is equipped with a suitable crank or the like 40 so that the electromagnet may be adjusted lengthwise of the rods 32.

The work piece, as shown, is supported by a supporting block 41 slidably mounted on the base 33 and adjustable toward and away from the magnet by a screw member 42 controlled by a hand wheel 43. This is one way to obtain adjustment of the magnet and work piece relatively toward and away from each other. The magnet may be made adjustable for this purpose. Now the test piece may be mounted in any suitable way, and in accordance with this invention it may be mounted by that mounting which is used for a tube when installed in a piece of commercial apparatus. For example, as shown in Fig. 4, the test piece is a tube having a flared end and is mounted by the means of a female coupling member 44 and a male coupling member 45 just as a tube is to be mounted when installed for use. The tube projects from this mounting (upwardly as shown herein) and its free end is positioned adjacent the magnet, the magnet being adjustable to accommodate work pieces of different lengths. The work piece just described would of necessity have to be a tube capable of being attracted by electromagnetic force. However, non-magnetic material may be tested by equipping the test piece with a ferrous metal adaptor. Such an adaptor may be any sort of a piece of ferrous metal associated with or secured to the test piece in any suitable way, which would depend upon the characteristics of the test piece. For example, the tube shown in Fig. 5 and illustrated at 50 may be an aluminum tube or a copper tube and the adaptor may be in the form of a ferrous metal plug 51 pushed snugly into the end of the tube. Of course, if the test piece is a strip of material or some other shape having no hollow cavity or the like, the adaptor would have to be secured to the same on the outside. This, however, may be elected by any one skilled in the art without a detailed illustration herein.

At the beginning of a test the work piece is mounted and the magnet adjusted to the proper and desired position relative to the work piece. The work piece is preferably retracted from the magnet so that upon the starting of the machine it is not unduly stressed. When the motors 4 and 15 are started, and the direct current exciter is functioning, the switch 27 may be closed so that the generated alternating current flows to the magnet. The alternating flux is impressed upon the work and the work may now be adjusted toward the magnet to bring the work effectively into the magnetic flux. The flux which is continually set up and broken down, attracts and releases the work or the adaptor applied thereto and causes vibration, and the work piece is illustrated by the broken lines in Fig. 1. One advantage is that a test piece which is curved or bent, as might be the case, for example, where a piece of strip is taken from a roll and subjected to test, does not interfere with the testing operation and the piece does not need to be straightened out. It is merely placed in the holder and the amplitude of vibration considered while the test piece remains in its curved or bent form. Such a test piece would be difficult to handle and would probably have to be straightened where it is tested with a mechanical apparatus.

In carrying out a test one may first select the stress in pounds per square inch under which the test is to be carried out. In selecting the stress one may be governed by the ultimate tensile strength of the material involved. The preferred procedure is to ascertain the deflection necessary in order to create, in the work piece, the stress under which the test is to be carried out. In this connection and for the purposes herein the deflection of the work piece is one-half the amplitude of vibration. It will readily be appreciated that the greater the deflection the greater the stress.

A suitable formula is available, and those skilled in the art may ascertain the deflection as follows: Having selected the stress at which the test is to be carried out, such other factors in the formula are: the modolus of elasticity of the material involved; the distance from the center of the test piece to the outermost part thereof, which in the case of a circular tube or rod would be the radius; and the length of the work piece. From this formula the extent of the deflection of the work piece necessary to produce the stress selected may be obtained.

It has been found that the best results are obtained by tuning the alternating flux to the natural frequency of vibration of the work piece. This is accomplished by adjusting the speed of the alternating current generator, which in the apparatus as shown, is done by adjusting the motor 4 on its mounting. When a test is started the work piece is preferably adjusted away from the magnet and the maximum amplitude of vibration thereof is readily ascertainable by the naked eye. The maximum amplitude of vibration occurs when the alternating flux frequency is in tune with the natural frequency of vibration of the work piece. Therefore at the start, the speed of the alternating current generator will be adjusted until the vibration of the work piece reaches maximum amplitude which, as expressed above, will be just twice the deflection. The work piece may now be shifted toward the magnet until the desired amplitude is reached, this amplitude being twice the known deflection which was ascertained as above pointed out.

The process may now be allowed to continue with or without interruption and without further adjustment until the material of the work piece begins to fail. And when the material begins to fail its frequency of vibration changes, with the result that this is readily perceptible because the amplitude of vibration decreases. In fact in some instances the amplitude of vibration will so materially decrease that there hardly appears to be any at all. When this is observed the frequency of the alternating flux is changed to again bring the same in tune with the frequency of vibration of the work piece, that is at maximum amplitude. It may be also necessary at this time to adjust the work piece toward or away from the magnet until the amplitude is twice the deflection desired. Having thus readjusted the machine the process is continued, but on this readjustment the test will not, or probably will not continue for long because the work is beginning to fail, and upon further failing will again get out of tune with the frequency of the flux so that a second readjustment is necessary, and this may be continued on through any desired number of readjustments, even to the point where there is complete breaking of the material of the work piece.

Such a test will give the time required to break down a test piece under certain stress. It will readily be observed that subsequent tests may be made under different stress conditions, or in other words, with like test pieces, a test condition where the maintained amplitude of vibration varies. From a series of these tests a curve illustrating the fatigue limit may be prepared where the stress and the time period are the abcissas and ordinates or vice versa.

Reference has been made to the maximum amplitude of vibration. This expression is not intended to convey the extreme extent of the amplitude obtainable in a given set up, but is used to mean this: with a given adjustment of the work piece relative to the magnet, even though the work piece be relatively remote therefrom so that the amplitude is relatively small, the speed of the generator may be varied until the maximum amplitude is ascertained with the work in the particular location of adjustment. Now this maximum amplitude may be considerably less than the amplitude desired in the test, but since the amplitude is at its maximum for a given position of the work, this fact indicates that the vibration frequency and the alternating flux are in tune. Then the work may be adjusted closer to the magnet to increase the amplitude to that point where the selected stress is attained.

In some cases it may be desirable to carry out the test at a relatively high rate of vibration or a lower rate of vibration. The test piece to be used may be selected to give the desired frequency of vibration under which the test is to be carried out. In other words, a piece which is too short may have too high a frequency so a test piece of sufficient length is selected which has a frequency suitable for testing purposes. Usually, for making a test, especially where the test piece is of unknown characteristics, the frequency of vibration of the test piece may be ascertained empirically by trying out several test pieces to obtain one with the desired frequency of vibration. At any time during the testing operation the number of stress reversals per unit of time, or in other words the rate of vibration, may be ascertained by the taking of the reading of the tachometer and calculating this reading with the nature of the generator to get the alternating current frequency. The number of reversals of the test piece will be twice the rate of the alternating current frequency.

Where an adaptor is used on non-magnetic material, the added weight of the adaptor, of course, affects the vibration frequency, and under such conditions the vibrating frequency of the test piece with the adaptor associated therewith may have to be ascertained.

The invention, of course, is not limited to the testing of work which is mounted only at one end and which acts as a cantilever in the testing action. The work may be mounted in other ways, as for example, by securing the work at opposite ends and the vibrating and intermediate portion. However, one advantage of the present invention is that a work piece may be mounted at one end and not otherwise gripped or restrained mechanically so that no indeterminate stress, torsion, compression or tension is placed in the material of the test piece.

In some of the claims appended hereto words are used to the effect that the test piece is arranged or adapted to be magnetically attracted. This is intended to cover both, test pieces of ferrous metal or test pieces of other metal or material requiring the use of adaptors.

I claim:

1. An apparatus for testing material from the standpoint of fatigue or endurance limit or the like which comprises, an electromagnet, supporting means for the magnet upon which the same is shiftable, means for shifting the magnet on the supporting means, a support for a test piece, means for shifting the test piece support for adjustably moving a portion of the test piece toward and away from the magnet, and means for impressing a discontinuous electrical current on the magnet whereby to continuously set up and break down magnetic flux for vibrating the test piece.

2. An apparatus for testing material from the standpoint of fatigue or endurance limit or the like which comprises, an electromagnet, supporting means for the magnet, means for shifting the magnet vertically on the supporting means, a support for a test piece, means for shifting the test piece support substantially horizontally toward and away from the magnet, and means for impressing a discontinuous electrical current on the magnet whereby to continuously set up and break down magnetic flux for vibrating the test piece.

3. An apparatus for testing material from the standpoint of fatigue or endurance limit or the like which comprises, an electromagnet, supporting means for the magnet upon which the same is shiftable, an adjusting screw member associated with the magnet operable to shift the magnet on its support, a support for a test piece, a threaded adjusting member for adjustably shifting the test piece support in a direction substantially normal to the direction of adjustment of the magnet so that the test piece may be moved toward and away from the magnet, and means for impressing a discontinuous electrical current on the magnet whereby to continuously set up and break down magnetic flux for vibrating the test piece.

DAVID R. KNOX.